United States Patent
Wang

(10) Patent No.: US 9,578,219 B2
(45) Date of Patent: Feb. 21, 2017

(54) IMAGE-CAPTURING DEVICE HAVING INFRARED FILTERING SWITCHOVER FUNCTIONS

(71) Applicant: Transcend Information, Inc., Taipei (TW)

(72) Inventor: Hung-Chieh Wang, Taichung (TW)

(73) Assignee: Transcend Information, Inc., Taipei (TW)

( * ) Notice: Subject to any disclaimer, the term of this patent is extended or adjusted under 35 U.S.C. 154(b) by 339 days.

(21) Appl. No.: 14/277,063

(22) Filed: May 14, 2014

(65) Prior Publication Data
US 2015/0334316 A1   Nov. 19, 2015

(51) Int. Cl.
H04N 7/18 (2006.01)
H04N 5/225 (2006.01)
H04N 5/33 (2006.01)
H04N 5/235 (2006.01)

(52) U.S. Cl.
CPC .......... H04N 5/2254 (2013.01); H04N 5/2252 (2013.01); H04N 5/2256 (2013.01); H04N 5/2354 (2013.01); H04N 5/33 (2013.01); H04N 5/332 (2013.01)

(58) Field of Classification Search
CPC ........ H04N 5/332; H04N 5/33; H04N 5/2256; H04N 5/2254; H04N 5/238; H04N 5/2252; H04N 5/2354
USPC ........................................................ 348/143
See application file for complete search history.

(56) References Cited

U.S. PATENT DOCUMENTS

| | | | | |
|---|---|---|---|---|
| 2004/0081451 A1* | 4/2004 | Takada | ..................... | G03B 9/02 396/508 |
| 2007/0262246 A1* | 11/2007 | Pittel | ..................... | G06F 3/0428 250/227.13 |
| 2009/0244913 A1* | 10/2009 | Anglikowski | ...... | F21V 23/0442 362/418 |
| 2010/0072351 A1* | 3/2010 | Mahowald | ................ | G01J 1/02 250/214 AL |
| 2010/0141770 A1* | 6/2010 | Gomi | .................... | H04N 5/2254 348/164 |
| 2012/0019832 A1* | 1/2012 | Momtahan | ............ | G06F 3/0317 356/446 |
| 2012/0087645 A1* | 4/2012 | Wu | .......................... | H04N 5/33 396/439 |
| 2013/0048837 A1* | 2/2013 | Pope | ..................... | G01J 1/0422 250/214.1 |

(Continued)

FOREIGN PATENT DOCUMENTS

CN   101750696 A  *  6/2010  ............. G02B 5/208

*Primary Examiner* — William Tran
(74) *Attorney, Agent, or Firm* — CKC & Partners Co., Ltd.

(57) ABSTRACT

An image-capturing device having infrared filtering switchover functions includes an infrared light emitting diode, an image sensor, an ambient light sensor, an infrared filter member and a switch module. The infrared light emitting diode emits infrared lights outwardly. The image sensor receives a reflection light reflected from an object. The ambient light sensor receives an ambient light. The infrared filter member filters infrared rays from the reflection light at a first location or the ambient light at a second location. The switch module is coupled to the infrared filter member, and can alternatively move the infrared filter member to the first location and the second location. The infrared lights are part of the reflection light and the ambient light.

20 Claims, 14 Drawing Sheets

(56) References Cited

U.S. PATENT DOCUMENTS

| | | | |
|---|---|---|---|
| 2013/0293379 A1* | 11/2013 | Rains, Jr. ............... | G08B 15/00 340/541 |
| 2014/0113324 A1* | 4/2014 | Di Carlo ................ | G01N 33/50 435/29 |
| 2015/0163418 A1* | 6/2015 | Chen ...................... | H04N 5/332 348/164 |

* cited by examiner

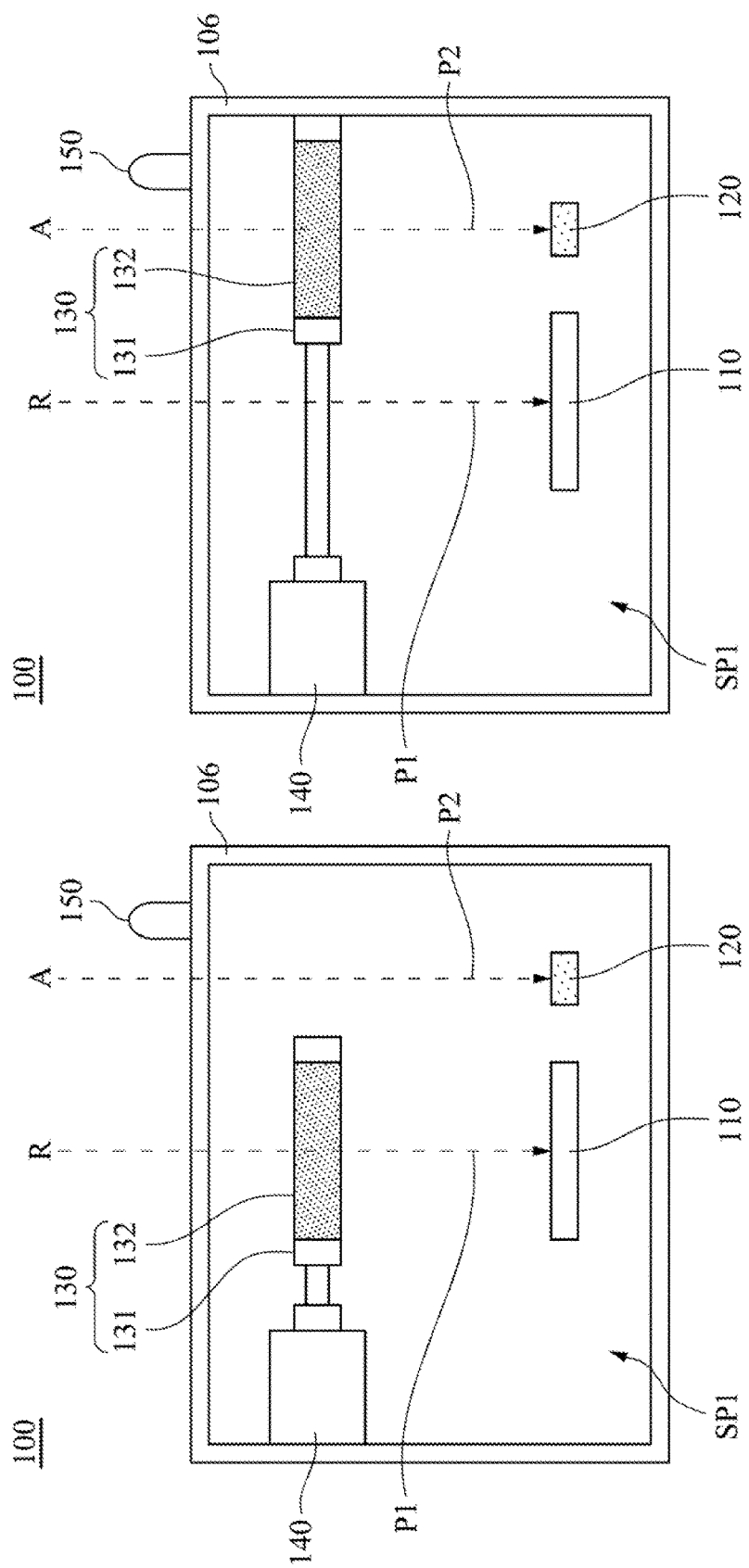

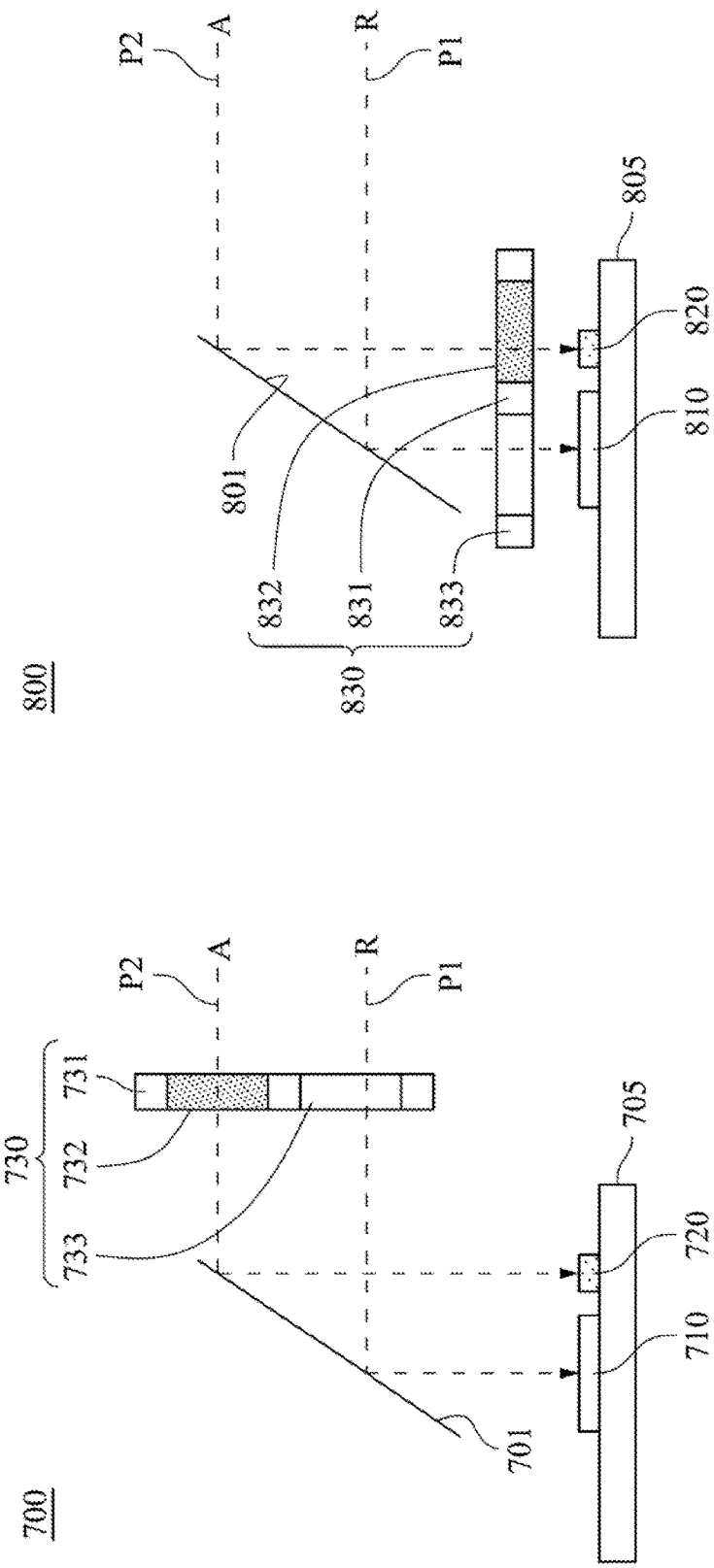

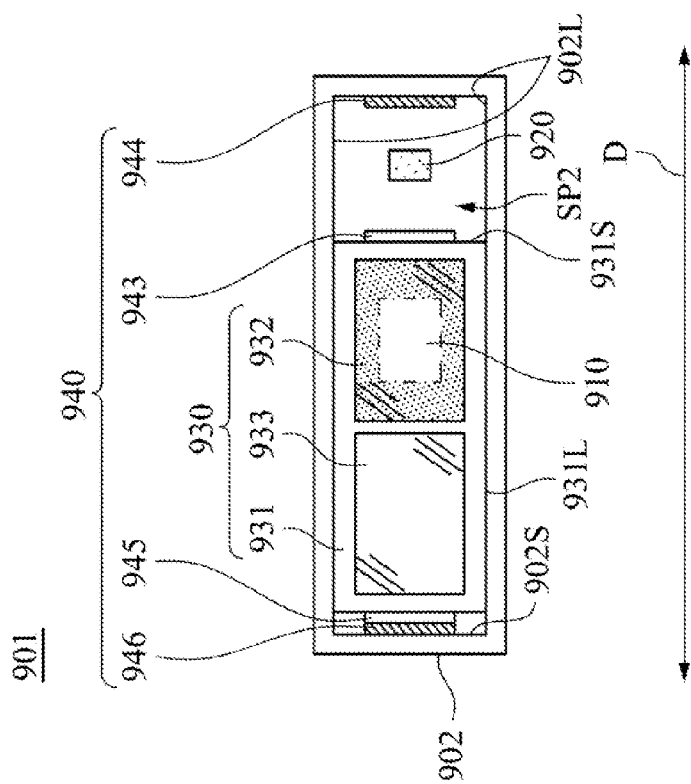
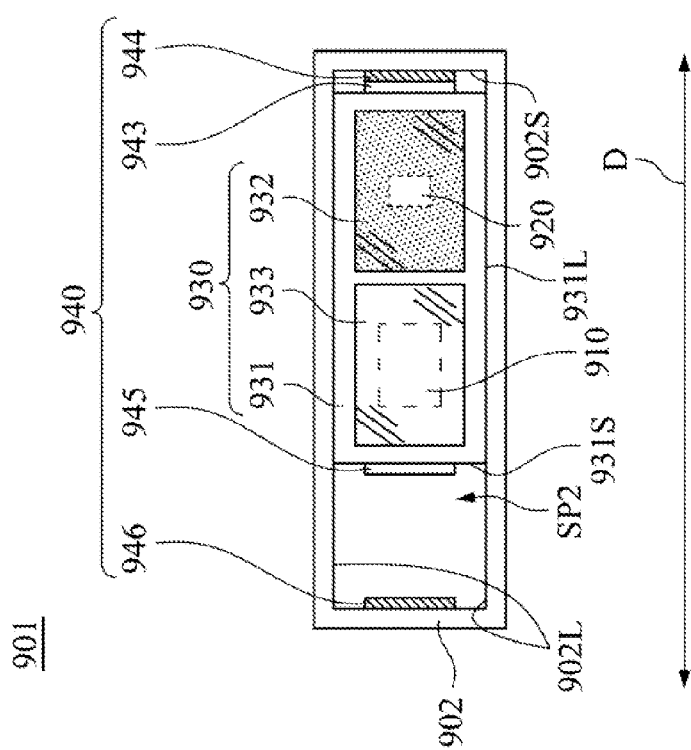
Fig. 9D
Fig. 9C

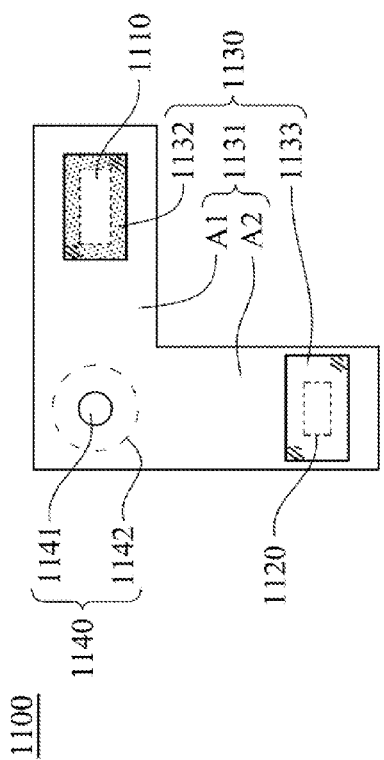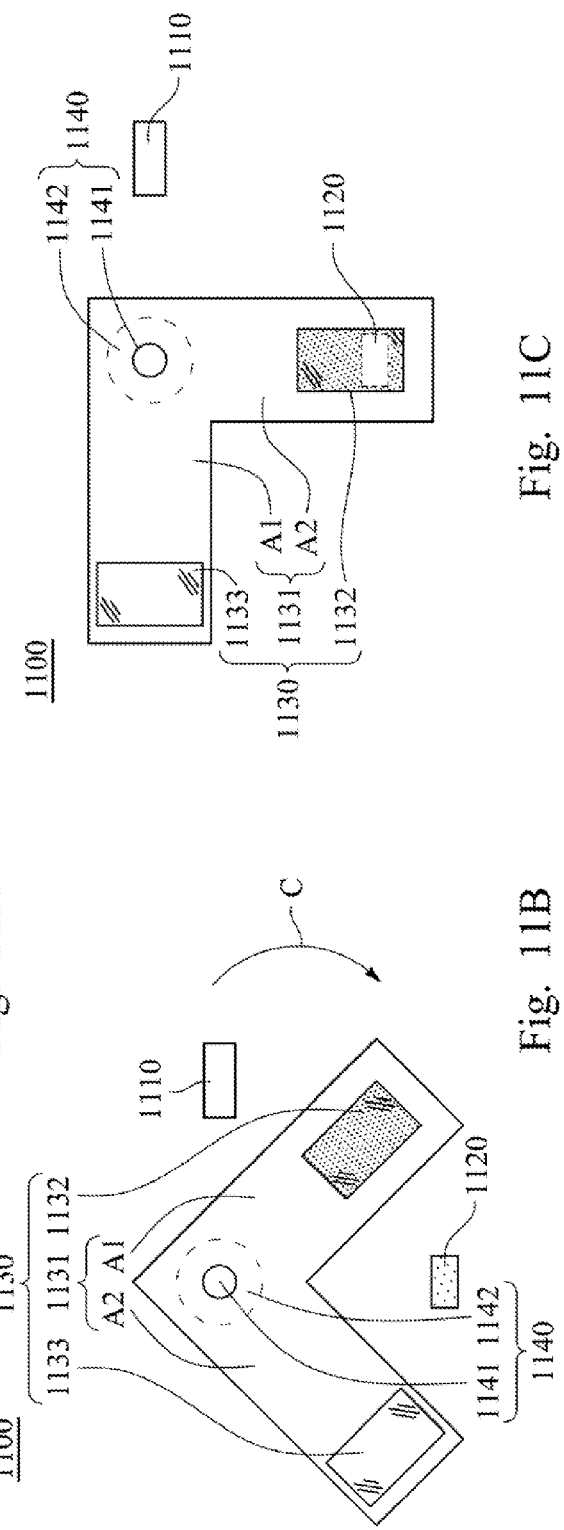
Fig. 11A
Fig. 11B
Fig. 11C

IMAGE-CAPTURING DEVICE HAVING INFRARED FILTERING SWITCHOVER FUNCTIONS

BACKGROUND

Field of Disclosure

The present disclosure relates to an image-capturing device. More particularly, the present disclosure relates to an image-capturing device having infrared filtering switchover functions.

Description of Related Art

Recently, a conventional surveillance camera is generally used for capturing surveillance videos day and night, and the surveillance camera is equipped with an ambient light sensor and an infrared light emitting diode (LED) thereon. The ambient light sensor is used to detect the intensity of the ambient lights around the infrared camera. When the ambient light sensor detects that the ambient light is dark, the surveillance camera will activate the infrared LED to provide auxiliary lights for increasing the clarity of the surveillance video. On the contrary, when the ambient light sensor detects that the ambient light is bright, the surveillance camera will shut down the infrared LED.

However, since the auxiliary lights provided by the infrared LED in the darkness are possible to cause the ambient light sensor to misjudge real brightness of the ambience around the surveillance camera, the infrared LED might be inadequately shut down by the surveillance camera. Accordingly, the conventional surveillance camera is of poor performance in capturing the surveillance videos in a dark environment.

As is evident from the above, the aforementioned conventional device still has disadvantages. Therefore, those of ordinary skill in the art are endeavoring to seek ways to effectively overcome such disadvantages.

SUMMARY

According to an embodiment, an image-capturing device having infrared filtering switchover functions is provided in which the image-capturing device includes a first housing, at least one infrared light emitting diode, an image sensor, an ambient light sensor, a filter assembly and a switch module. The infrared light emitting diode is disposed on the first housing, and the image sensor, the ambient light sensor, the filter assembly and the switch module are disposed in the first housing. The image sensor receives a first light reflected from an object. The ambient light sensor receives a second light. The filter assembly includes an infrared filter member. The infrared filter member filters infrared rays from the first light at a first location, and filters infrared rays from the second light at a second location. The switch module is coupled to the filter assembly, and alternatively moves the infrared filter member to the first location covering the image sensor and the second location covering the ambient light sensor. The infrared light is part of the first light and the second light.

According to one or more embodiments, the first location is on a first optical path of the first light traveling to the image sensor, and the second location is on a second optical path of the second light traveling to the ambient light sensor.

According to one or more embodiments, the image-capturing device further includes a lens element. The lens element is disposed on a first optical path of the first light traveling to the image sensor. The filter assembly is disposed between the lens element and the image sensor.

According to one or more embodiments, the image-capturing device further includes a lens element. The lens element is disposed on a first optical path of the first light traveling to the image sensor, and the lens element is disposed between the filter assembly and the image sensor.

According to one or more embodiments, the image-capturing device further includes a second housing. The second housing has an accommodation space therein for receiving the ambient light sensor, the filter assembly and the switch module, and an aperture is formed on the second housing, and the second light is received by the ambient light sensor via the aperture.

According to one or more embodiments, the image-capturing device further includes a second housing. The second housing has an accommodation space therein for receiving the filter assembly and the switch module, and the ambient light sensor is arranged out of the second housing, and two apertures are formed on opposite sides of the second housing, thus the second light is received by the ambient light sensor via the two apertures.

According to one or more embodiments, the image-capturing device further includes an optical reflective element for reflecting the first light towards the image sensor, and reflecting the second light towards the ambient light sensor, and the filter assembly is optically arranged between the optical reflective element and the ambient light sensor.

According to one or more embodiments, the image-capturing device further includes an optical reflective element. The optical reflective element reflects the first light towards the image sensor, and reflects the second light towards the ambient light sensor. The optical reflective element is optically arranged between the filter assembly and the ambient light sensor, and the optical reflective element is optically arranged between the filter assembly and the image sensor According to one or more embodiments, the switch module further includes a rotary shaft and a driving element. The rotary shaft is connected to the filter assembly, so as to allow the filter assembly to rotate about a rotation axis of the rotary shaft. The driving element drives the rotary shaft to rotate.

According to one or more embodiments, the image-capturing device further includes a light guide element. The light guide element is disposed between the ambient light sensor and the filter assembly, and guides the second light towards the ambient light sensor.

According to one or more embodiments, the image-capturing device further includes a second housing. The second housing has an accommodation space therein for receiving the filter assembly and the switch module. The switch module further includes at least two magnetic bodies and at least two electromagnetic bodies. The at least two magnetic bodies are coupled to opposite sides of the filter assembly, and the at least two electromagnetic bodies are disposed on two opposite inner walls of the second housing, and moves the filter assembly between the first location and the second location by exerting magnetic forces to the at least two magnetic bodies in opposite directions.

The present disclosure also provides an image-capturing device having infrared filtering switchover functions in which the image-capturing device includes a first housing, at least one infrared light emitting diode (LED) disposed on the first housing, an image sensor disposed in the first housing, an ambient light sensor disposed in the first housing, a filter assembly disposed in the first housing, a switch module disposed in the first housing and a controller disposed in the first housing. The infrared LED emits infrared lights outwardly. The image sensor receives a first light reflected from an object, and converts the first light into a video signal. The ambient light sensor receives a second light from the ambience, and converts the second light into a detecting signal. The filter assembly includes an infrared filter member. The infrared filter member filters infrared rays from the first light at a first location and the second light at a second location. The switch module is coupled to the filter assembly, and alternatively moves the infrared filter member to the first location covering the image sensor and the second location covering the ambient light sensor. The controller is electrically connected to the infrared light emitting diode, the switch module and the ambient light sensor. Therefore, when the controller determines that the second light is below a predetermined threshold in accordance with the detecting signal of the ambient light sensor, the controller controls the at least one infrared light emitting diode to emit the infrared lights and controls the switch module to move the infrared filter member to the second location.

The specific details of the present disclosure will be explained in the embodiments below and related drawings.

BRIEF DESCRIPTION OF THE DRAWINGS

The disclosure may be more fully understood by reading the following detailed description of the embodiment, with reference made to the accompanying drawings as follows:

FIG. 1A and FIG. 1B are schematic views of an image-capturing device when an infrared filter member is respectively moved to cover an image sensor and an ambient light sensor according to a first embodiment of the disclosure;

FIG. 7 is a schematic view of an image-capturing device when an infrared filter member is moved to an optical path of the ambient light to the ambient light sensor according to a seventh embodiment of the disclosure;

FIG. 8 is a schematic view of an image-capturing device when an infrared filter member is moved to an optical path of the ambient light to the ambient light sensor according to an eighth embodiment of the disclosure;

FIG. 9C and FIG. 9D are front views of an image-capturing device when an infrared filter member respectively moves on top of an image sensor and an ambient light sensor according to another variation of a ninth embodiment of the disclosure;

FIG. 11A to FIG. 11C are front views of an image-capturing device when an infrared filter member respectively moves on top of an image sensor and an ambient light sensor according to an eleventh embodiment of the disclosure.

DETAILED DESCRIPTION

Figure 1C:
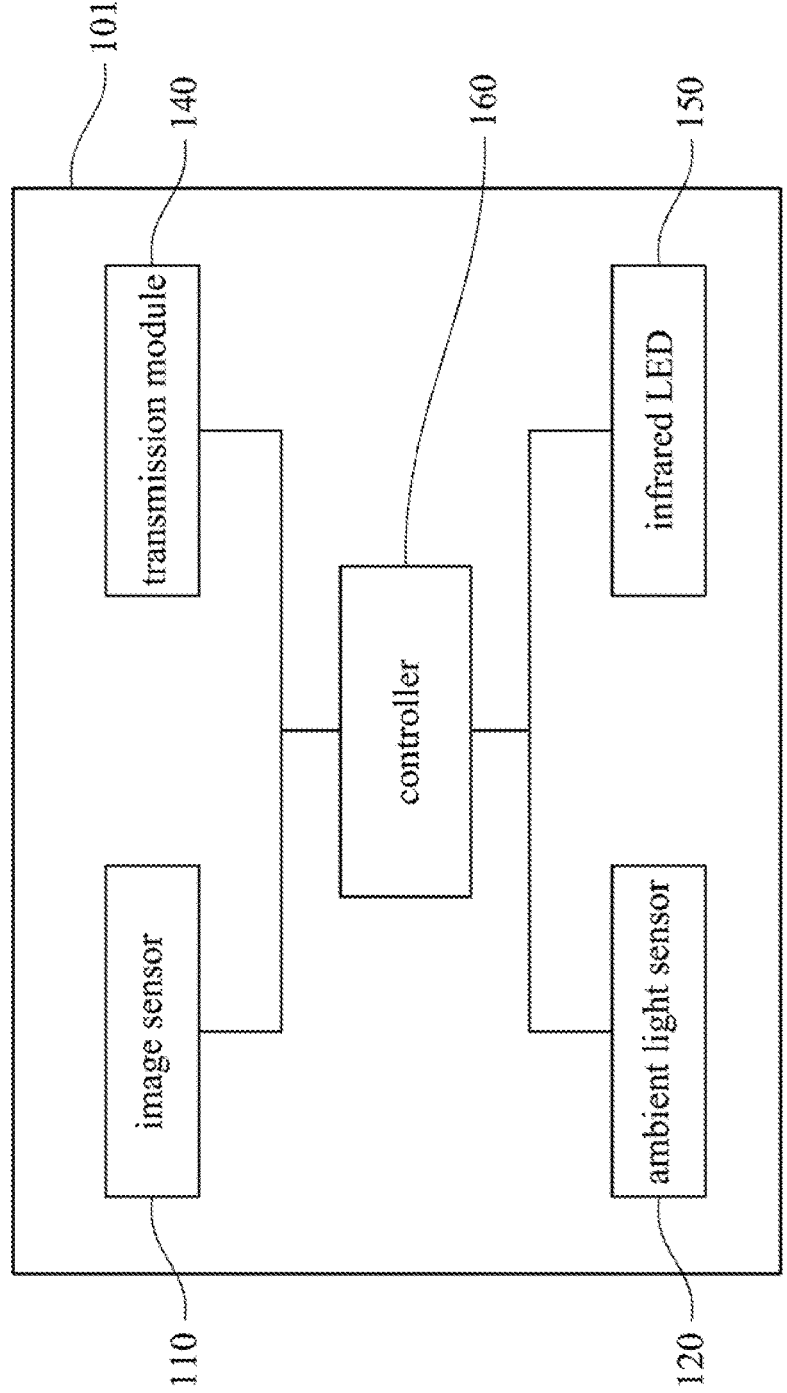
FIG. 1C is a block diagram illustrating an image-capturing device according to the first embodiment of the disclosure.

The following embodiments are disclosed with accompanying diagrams for detailed description. For illustration clarity, many details of practice are explained in the following descriptions. However, it should be understood that these details of practice do not intend to limit the present disclosure. That is, these details of practice are not necessary in parts of embodiments of the present disclosure. Furthermore, for simplifying the drawings, some of the conventional structures and elements are not shown with schematic illustrations.

First Embodiment

Reference is now made to FIG. 1A and FIG. 1B in which FIG. 1A and FIG. 1B are schematic views of an image-capturing device 100 when an infrared filter member 132 respectively moves to cover an image sensor 110 and an ambient light sensor 120 according to a first embodiment of the disclosure. As shown in FIG. 1A, the image-capturing device 100 includes a first housing 106, an image sensor 110, an ambient light sensor 120, a filter assembly 130 and a switch module 140 in which the first housing 106 is defined with a containing space SP1 therein, and the image sensor 110, the ambient light sensor 120, the fitter assembly 130 and the switch module 140 are disposed in the containing space SP1. The image sensor 110 receives a reflection light R reflected from an object (not shown) after one of ambient lights impinges on the object, and converts the reflection light R into a video signal. The ambient light sensor 120 receives another ambient light A, converts the ambient light A into a detecting signal, and transmits the detecting signal out. The filter assembly 130 includes an infrared filter member 132. The infrared filter member 132 filters infrared rays from the reflection light R at a first location and filters infrared rays from the ambient light A at a second location. The switch module 140 alternatively moves the infrared filter member 132 to the first location covering the image sensor 110 and the second location covering the ambient light sensor 120. In the disclosure, the first location and the second location are not limited, the first location can be anywhere on a first optical path P1 of the reflection light R traveling to the image sensor 110, and the second location can be anywhere on a second optical path P2 of the ambient light A traveling to the ambient light sensor 120.

In this embodiment, the filter assembly 130 further includes a main body 131. The main body 131 is mechanically connected to the switch module 140 and the infrared filter member 132, and the infrared filter member 132 is loaded by the main body 131. Thus, the infrared filter member 132 can be moved along with the main body 131 of the filter assembly 130 to the first location or the second location.

For example, when the ambient light sensor 120 detects that the ambient light A is bright, the switch module 140 moves the main body 131 of the filter assembly 130, and the infrared filter member 132 is arranged to position on the first position for filtering the infrared rays of the reflection light R. Since the infrared rays of the reflection light R (e.g., daylight or lights of illumination) may interfere with the video signal converted in the image sensor 110 and result in color distortion to the captured images, by sheltering the image sensor 110, the infrared filter member 132 can block most of the infrared rays of the reflection light R for improving the quality of the captured images.

On the contrary, as shown in FIG. 1B, when the ambient light sensor 120 detects that the ambient light A is dark, the switch module 140 is instructed to move the infrared filter member 132 away from the first optical path P1 of the reflection light R, so as to ensure that the maximum volume of the reflection light R can be received by the image sensor 110.

FIG. 1C is a block diagram illustrating an image-capturing device 100 according to the first embodiment of the disclosure. Referring to FIG. 1B and FIG. 1C, the image-capturing device 100 further includes at least one infrared light emitting diode 150 (LED) and a controller 160. The infrared LED 150 is disposed on the first housing 106, and is arranged to emit infrared lights out of the image capturing device 100. The controller 160 is electrically connected to the image sensor 110, the switch module 140, the ambient light sensor 120 and the infrared LED 150, and the controller 160 controls the image sensor 110, the switch module 140, the ambient light sensor 120 and the infrared LED 150 to work.

After the detecting signal of the ambient light sensor 120 is transmitted to the controller 160, the controller 160 determines whether the light intensity of the ambient light A is below a predetermined threshold in accordance with the detecting signal of the ambient light sensor 120. When the controller 160 determines that the light intensity of the ambient light A is not below the predetermined threshold, which indicates that the ambient light A is bright, the controller 160 triggers the switch module 140 to move the filter assembly 130. Thus, refer to FIG. 1A, the infrared filter member 132 of the filter assembly 130 is moved to a position on the first optical path P1 of the reflection light R, so that the infrared filter member 132 filters the infrared rays from the reflection light R.

On the other hand, when the controller 160 determines that the light intensity of the ambient light A is below the predetermined threshold, which indicates that the ambient light A is dark, refer to FIG. 1B, the controller 160 triggers the infrared LED 150 to emit infrared lights for increasing the light intensity of the ambient light A, and triggers the switch module 140 to move the filter assembly 130, and the infrared filter member 132 of the filter assembly 130 is moved to a position on the second optical path P2 of the ambient light A, so that the infrared filter member 132 filters the infrared rays from the ambient light A so as to avoid the ambient light sensor 120 from being effected by the infrared lights of the infrared LED 150.

Since the infrared filter member 132 can cover the ambient light sensor 120 for filtering the infrared rays from the ambient light A, there is no need to specifically select certain type of the ambient light sensor which will not be affected by infrared lights, so the purchasing cost of the ambient light sensor can be reduced.

Second Embodiment

Figure 2:
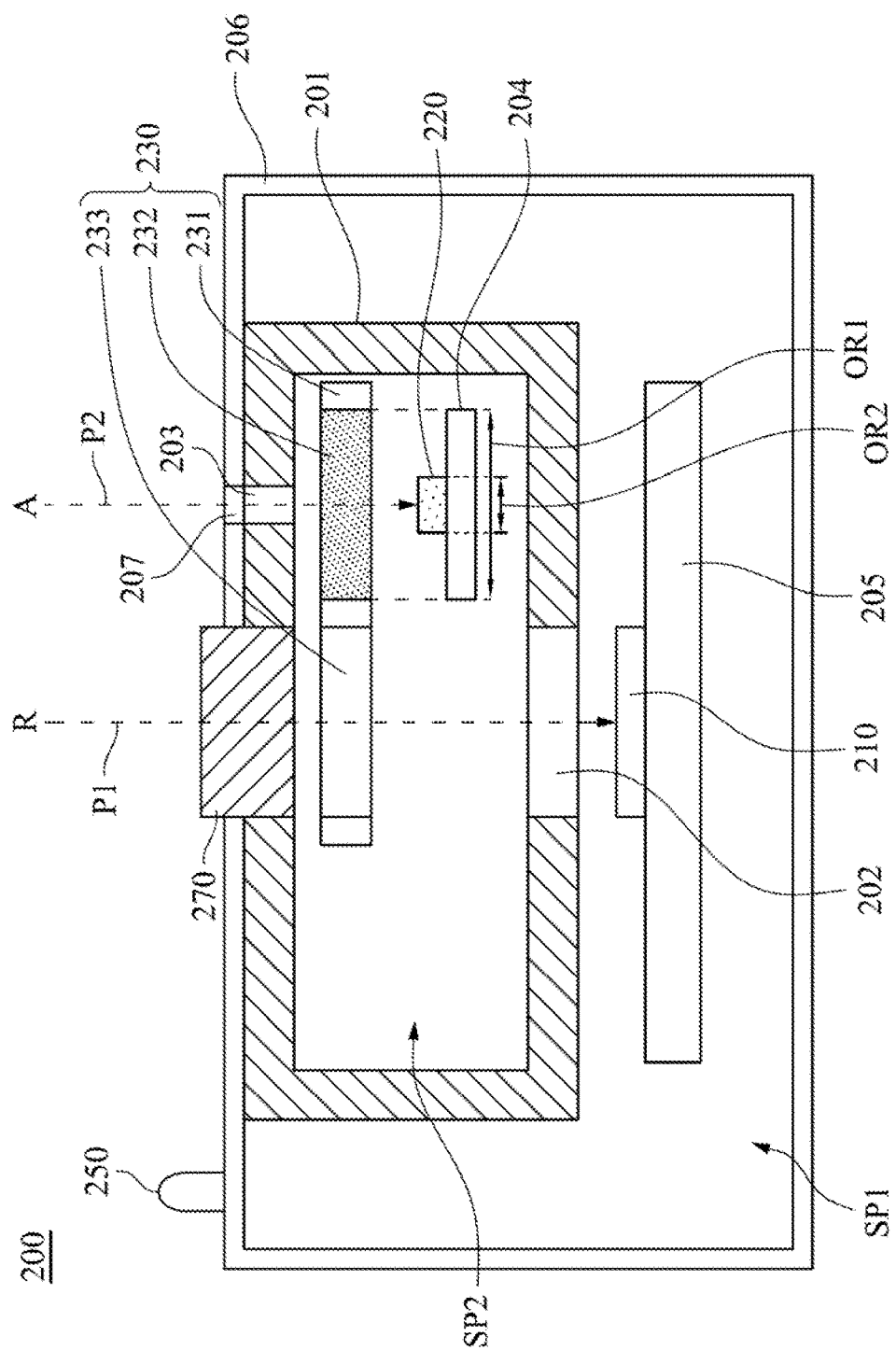
FIG. 2 is a schematic view of an image-capturing device when an infrared filter member is moved on top of an ambient light sensor according to a second embodiment of the disclosure.

Reference is now made to FIG. 2 in which FIG. 2 is a schematic view of an image-capturing device 200 when an infrared filter member 232 is moved to cover an ambient light sensor 220 according to a second embodiment of the disclosure. Compared to the first embodiment, the image-capturing device 200 of the second embodiment further includes a second housing 201, a lens element 270 and a first circuit board 204. The second housing 201 is disposed in the containing space SP1, and is defined with an accommodation space SP2 therein. The ambient light sensor 220, the filter assembly 230, the first circuit board 204 and the switch module (Not shown in FIG. 2) are received in the accommodation space SP2 in which the first circuit board 204 is electrically connected to the ambient light sensor 220 and the switch module and exchanged signals with the ambient light sensor 220 and the switch module, and the ambient light sensor 220 is fixedly mounted on a surface of the first circuit board 204. The lens element 270 is at least engaged on the first housing 206, and is disposed on the first optical path P1 of the reflection light R traveling to the image sensor 210. The infrared light emitting diode 250 is arranged out of the second housing 201, for example, the infrared light emitting diode 250 is disposed on the first housing 206 of the image-capturing device 200. In this embodiment, the filter assembly 230 is disposed between the lens element 270 and the image sensor 210.

Furthermore, the image-capturing device 200 of the second embodiment further includes a second circuit board 205. The second circuit board 205 and the image sensor 210 are disposed in the containing space SP1, not in the accommodation space SP2, that is, the second circuit board 205 and the image sensor 210 are out of the second housing 201. The image sensor 210 is mounted on a surface of the second circuit board 205, and electrically connected to the second circuit board 205.

Also, the second housing 201 is formed with a through hole 202. The through hole 202 is disposed on the first optical path P1 of the reflection light R traveling to the image sensor 210. Thus, before the reflection light R is received by the image sensor 210, the reflection light R at least passes through the lens element 270 and the through hole 202.

Moreover, in order to protect the image sensor 210 from being contaminated, the filter assembly 230 further includes a transparent sheet 233. The transparent sheet 233 is mechanically connected to the main body 231. Thus, the transparent sheet 233 is mechanically connected to the infrared filter member 232 together. In the embodiment, the transparent sheet 233 and the infrared filter member 232 are arranged abreast on the main body 231. However, the present disclosure is not limited thereto.

When the infrared filter member 232 moves to the second optical path P2 of the ambient light A, the transparent sheet 233 is positioned to the first optical path P1 of the reflection light R, making the reflection light R pass through the transparent sheet 233.

It is noted, an aperture 207 is formed on the first housing 206, and an aperture 203 is formed on the second housing 201. The apertures 203, 207 are coaxially aligned with each other, and the apertures 203, 207 are disposed on the second optical path P2 of the ambient light A. Thus, the ambient light A is received by the ambient light sensor 220 via the apertures 203, 207.

In the embodiment, referring to FIG. 2, the second optical path P2 of the ambient light A segmented between the filter assembly 230 and the ambient light sensor 220 is straight, that is, when the infrared filter member 232 is moved to the second optical path P2 of the ambient light A, an orthographic projection OR1 of the infrared filter member 232 on the surface of the first circuit board 204 and an orthographic projection OR2 of the ambient light sensor 220 on the surface of the first circuit board 204 are overlapped with each other. More particularly, the ambient light sensor 220 is fully covered by an orthographic projection OR1 of the infrared filter member 232.

Third Embodiment

Figure 3:
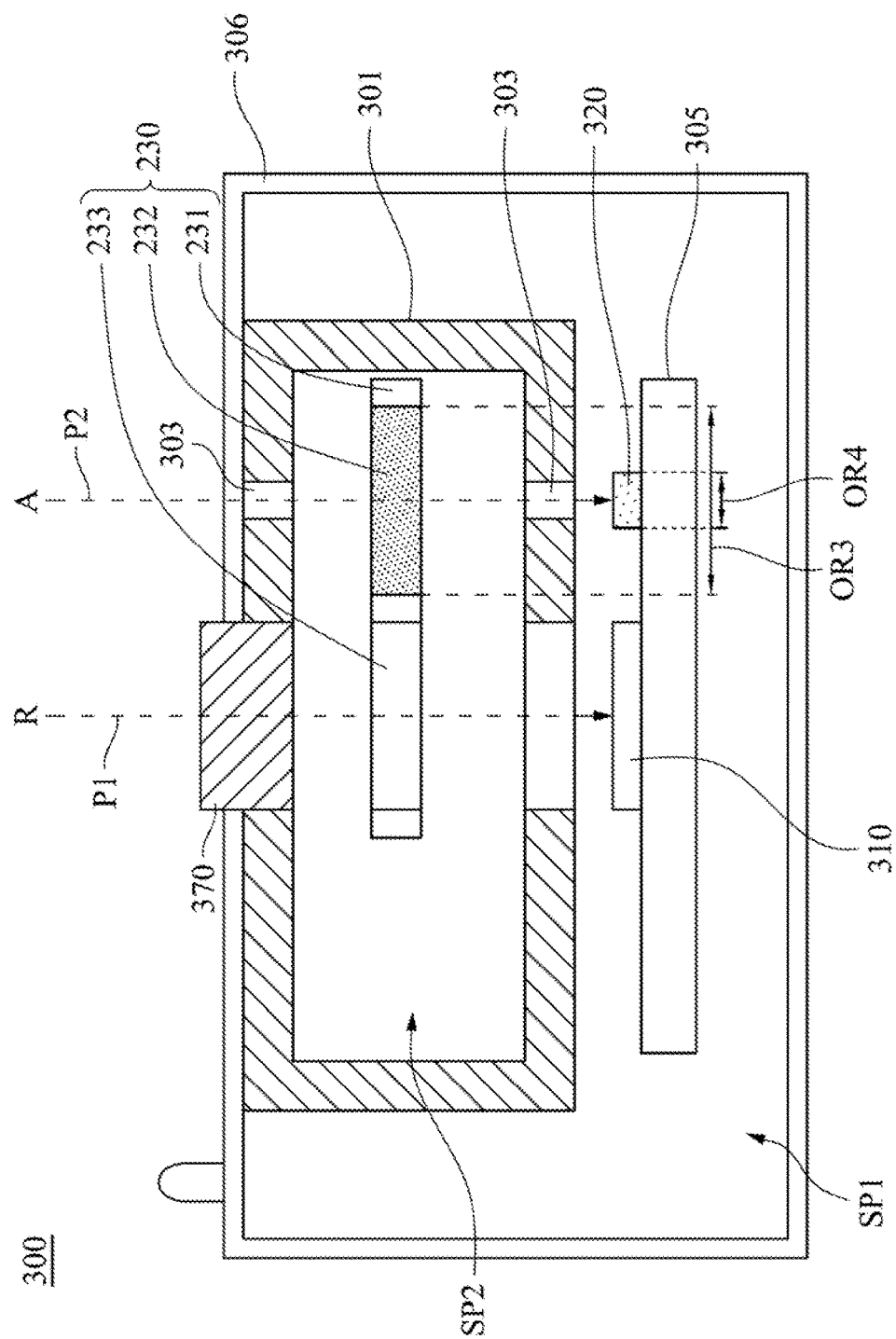
FIG. 3 is a schematic view of an image-capturing device when an infrared filter member is moved on top of an ambient light sensor according to a third embodiment of the disclosure.

Reference is now made to FIG. 3 in which FIG. 3 is a schematic view of an image-capturing device 300 when an infrared filter member 332 is moved to cover an ambient light sensor 320 according to a third embodiment of the disclosure. The image-capturing device 300 of the third embodiment is substantially the same as the image-capturing device 200 of the second embodiment except that the ambient light sensor 320 of the third embodiment is arranged out of the second housing 301, for example, is in the containing space SP1, and still can receive the ambient light A. The ambient light sensor 320 is fixedly mounted on the surface of the second circuit board 305 on which the image sensor 310 is fixedly mounted, and the ambient light sensor 320 is electrically connected to the second circuit board 305.

Specifically, the second housing 301 is formed with two penetrating apertures 303. The penetrating apertures 303 are arranged on two opposite sides of the second housing 301 in which the penetrating apertures 303 are arranged coaxially, and the penetrating apertures 303 are both disposed on the second optical path P2 of the ambient light A traveling to the ambient light sensor 320. Thus, the ambient light A is received by the ambient light sensor 320 via the penetrating apertures 303.

In the embodiment, referring to FIG. 3, the second optical path P2 of the ambient light A segmented between the filter assembly 330 and the ambient light sensor 320 is straight, that is, when the infrared filter member 332 is moved to the second optical path P2 of the ambient light A, an orthographic projection OR3 of the infrared filter member 332 on the surface of the second circuit board 305 and an orthographic projection OR4 of the ambient light sensor 320 on the surface of the second circuit board 305 are overlapped with each other. More particularly, the ambient light sensor 320 is fully covered by an orthographic projection OR3 of the infrared filter member 332.

Fourth Embodiment

Figure 4:
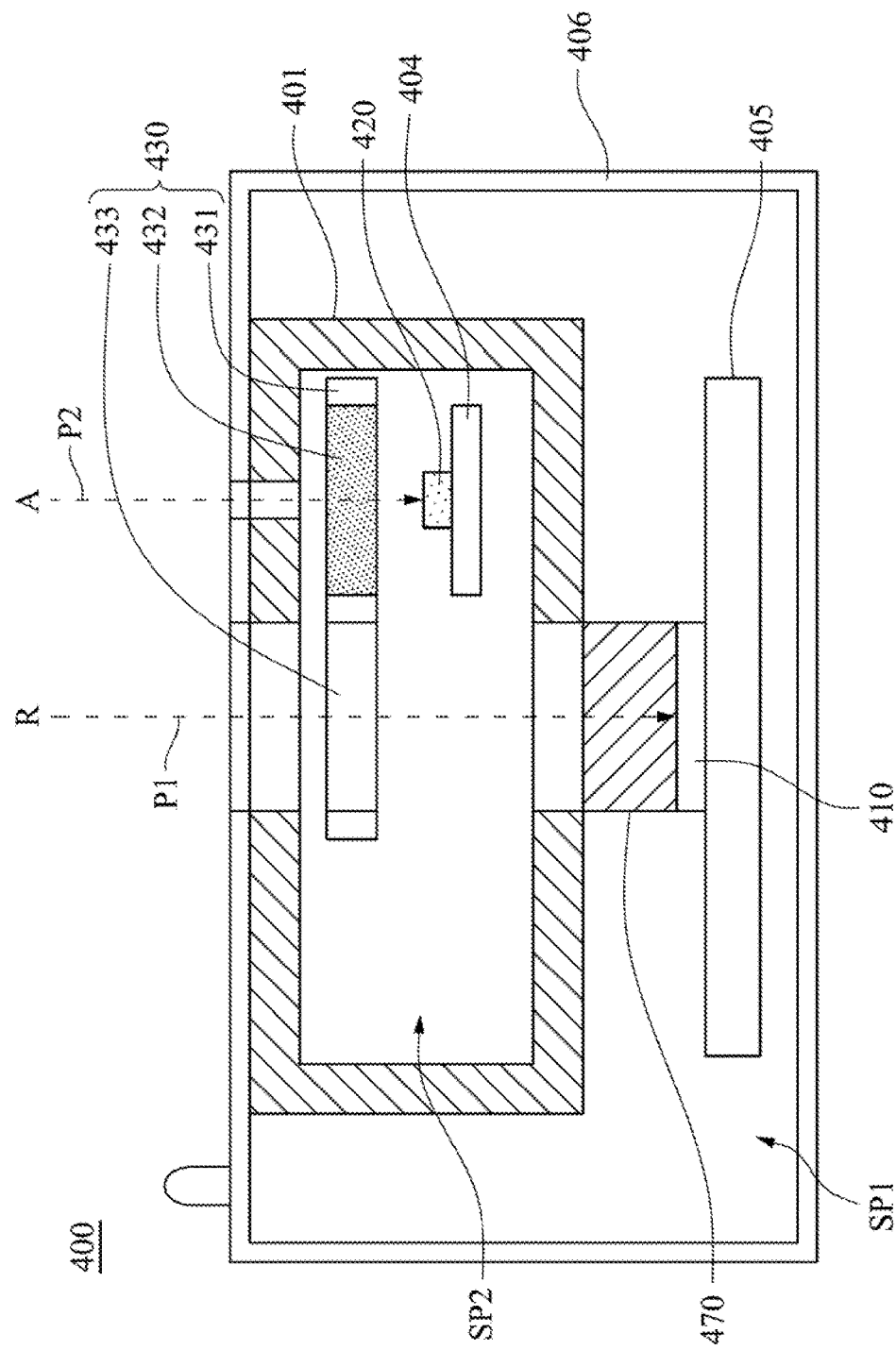
FIG. 4 is a schematic view of an image-capturing device when an infrared filter member is moved on top of an ambient light sensor according to a fourth embodiment of the disclosure.

FIG. 4 is a schematic view of an image-capturing device 400 when an infrared filter member 432 is moved to cover an ambient light sensor 420 according to a fourth embodiment of the disclosure. Referring to FIG. 4, the image-capturing device 400 of the fourth embodiment is substantially the same as the image-capturing device 200 of the second embodiment except that the lens element 470 of the fourth embodiment is arranged out of the second housing 401, for example, is in the containing space SP1, and still disposed on the first optical path P1 of the reflection light R. Specifically, the lens element 470 is optically disposed between the filter assembly 430 and the image sensor 410. Thus, the second housing 401 receiving the ambient light sensor 420, the filter assembly 430 and the switch module can be detachable from the lens element 470.

Fifth Embodiment

Figure 5:
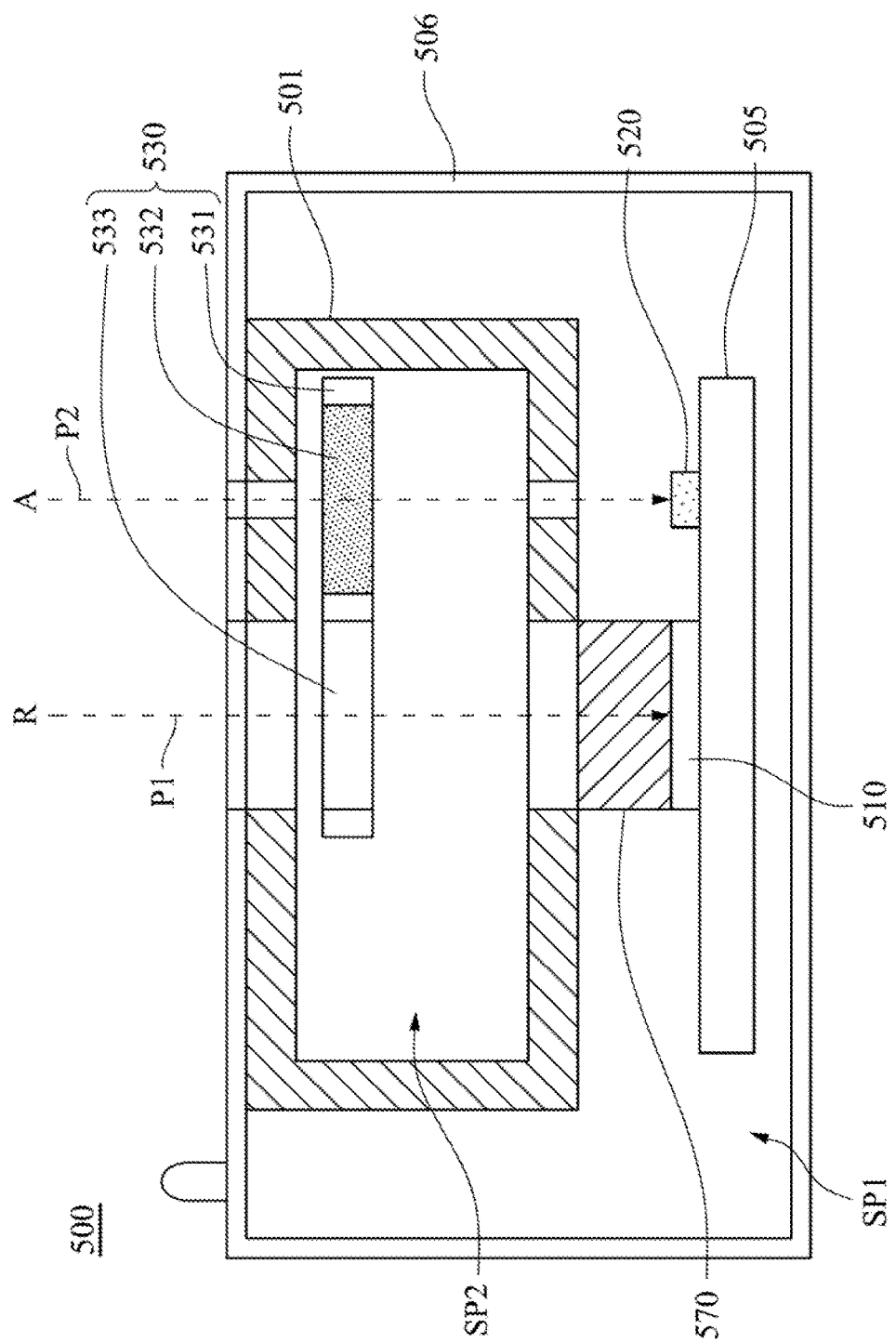
FIG. 5 is a schematic view of an image-capturing device when an infrared filter member is moved to filter infrared rays from lights to be captured by an ambient light sensor according to a fifth embodiment of the disclosure.

FIG. 5 is a schematic view of an image-capturing device 500 when an infrared filter member 532 is moved to cover an ambient light sensor 520 according to a fifth embodiment of the disclosure. Referring to FIG. 5, the image-capturing device 500 of the fifth embodiment is substantially the same as the image-capturing device 400 of the fourth embodiment except that the ambient light sensor 520 of the fifth embodiment is arranged out of the second housing 501, for example, is in the containing space SP1, and still can receive the ambient light A. The ambient light sensor 520 is fixedly mounted on the surface of the second circuit board 505 on which the image sensor 510 is fixedly mounted, and the ambient light sensor 520 is electrically connected to the second circuit board 505. Thus, the second housing 501 receiving the filter assembly 530 and the switch module can be detachable from the lens element 570, and the second housing 501 can be flat in volume.

Sixth Embodiment

Figure 6:
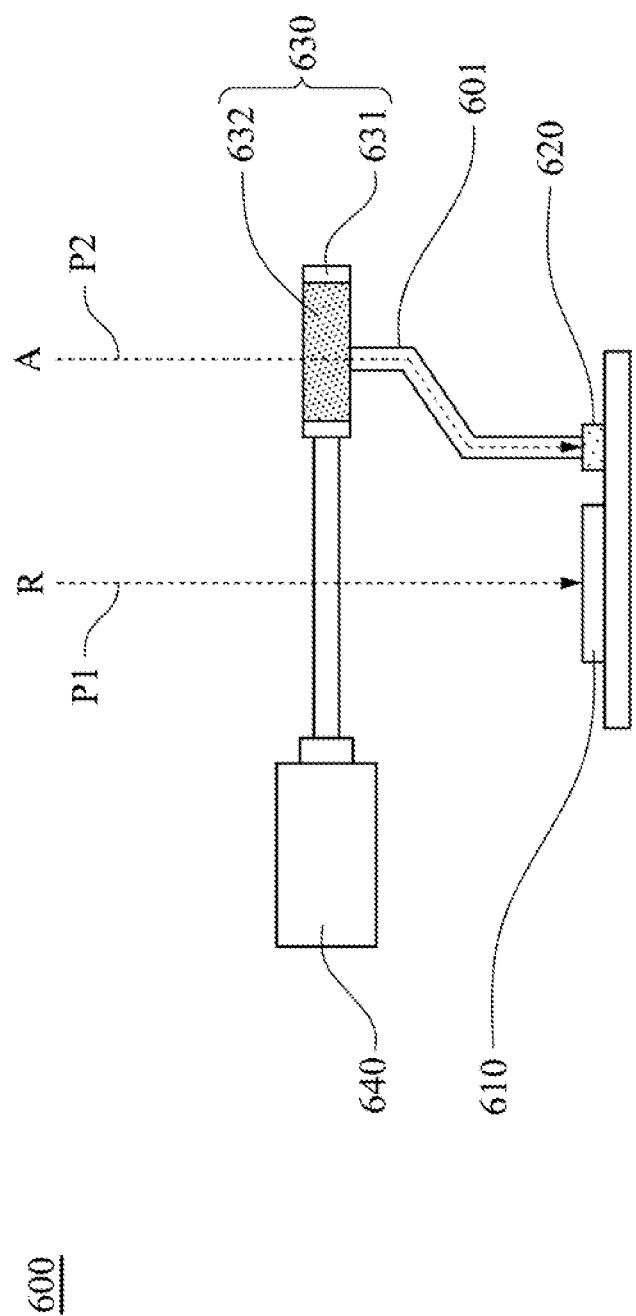
FIG. 6 is a schematic view of an image-capturing device when an infrared filter member is moved to filter infrared rays from lights to be captured by an ambient light sensor according to a sixth embodiment of the disclosure.

FIG. 6 is a schematic view of an image-capturing device 600 when an infrared filter member 632 is moved to cover an ambient light sensor 620 according to a sixth embodiment of the disclosure. Referring to FIG. 6, compared to the first embodiment, the image-capturing device 600 of the sixth embodiment includes a light guide element 601. The light guide element 601 is bending, disposed between the ambient light sensor 620 and the filter assembly 630, and guides the ambient light A to the ambient light sensor 620.

In this embodiment, the ambient light sensor 620 is not optically covered by the infrared filter member 632, that is, the ambient lights received by the ambient light sensor does not entirely pass through the infrared filter member 632 before, therefore the light guide element 601 is disposed to guide the ambient light A from the infrared filter member 632 to the ambient light sensor 620.

Seventh Embodiment

FIG. 7 is a schematic view of an image-capturing device 700 when an infrared filter member 732 is moved to an optical path of the ambient light A to an ambient light sensor 720 according to a seventh embodiment of the disclosure. Referring to FIG. 7, the image-capturing device 700 of the seventh embodiment further includes an optical reflective element 701. The optical reflective element 701 is optically arranged between the filter assembly 730 and the ambient light sensor 720, and is optically arranged between the filter assembly 730 and the image sensor 710, so that the second optical path P2 of the ambient light A segmented between a filter assembly 730 and the ambient light sensor 720 is not straight, for example is "L" shaped. The optical reflective element 701, for example, can be a mirror, and used for reflecting the reflection light R towards the image sensor 710, and reflecting the ambient light A towards the ambient light sensor 720. The filter assembly 730 is arranged on positions for the ambient light A passing through the infrared filter member 732 or a transparent sheet 733 before reflected by the optical reflective element 701. Thus, the infrared rays of the ambient light A can be filtered by the infrared filter member 732 then reflected towards the ambient light sensor 720

Also, in the embodiment, the ambient light sensor 720 is fixedly mounted on a surface of the second circuit board 705 on which the image sensor 710 is fixedly mounted as well, and is electrically connected to the second circuit board 705.

However, the disclosure is not limited thereto, in other embodiments, the ambient light sensor and the image sensor can be mounted on different circuit boards.

Eighth Embodiment

FIG. 8 is a schematic view of an image-capturing device 800 when an infrared filter member 832 is moved to an optical path of the ambient light A to the ambient light sensor 820 according to an eighth embodiment of the disclosure. Referring to FIG. 8, the image-capturing device 800 of the eighth embodiment is substantially the same as the image-capturing device 700 of the seventh embodiment except that the filter assembly 830 of the eighth embodiment is optically arranged between the optical reflective element 801 and the ambient light sensor 820, for example, the filter assembly 830 is linearly arranged between the optical reflective element 801 and the ambient light sensor 820, thus, it indicated that the second optical path P2 of the ambient light A segmented between the filter assembly 830 and the ambient light sensor 820 still can be straight.

Ninth Embodiment

Figure 9A:
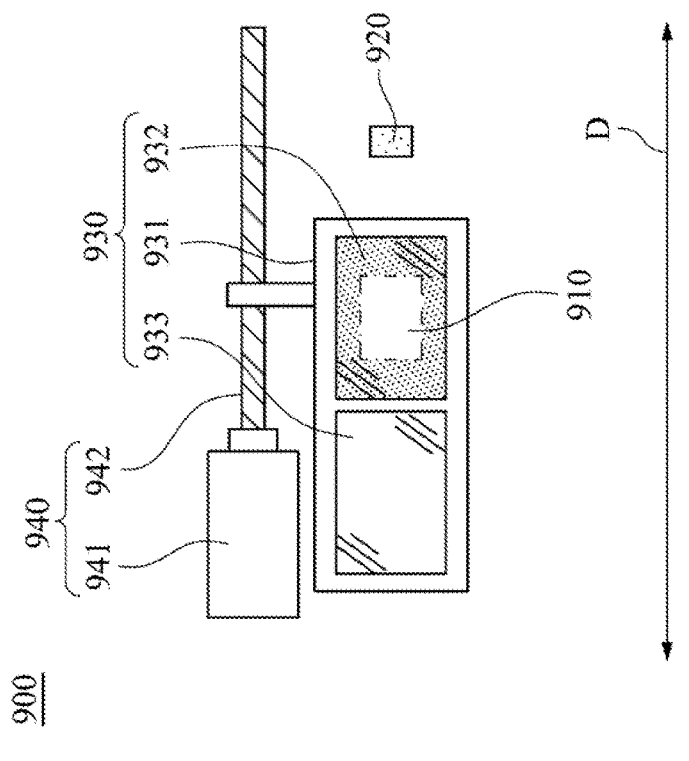
FIG. 9A and FIG. 9B are front views of an image-capturing device when an infrared filter member respectively moves to cover an image sensor and an ambient light sensor according to one variation of a ninth embodiment of the disclosure.
Figure 9B:
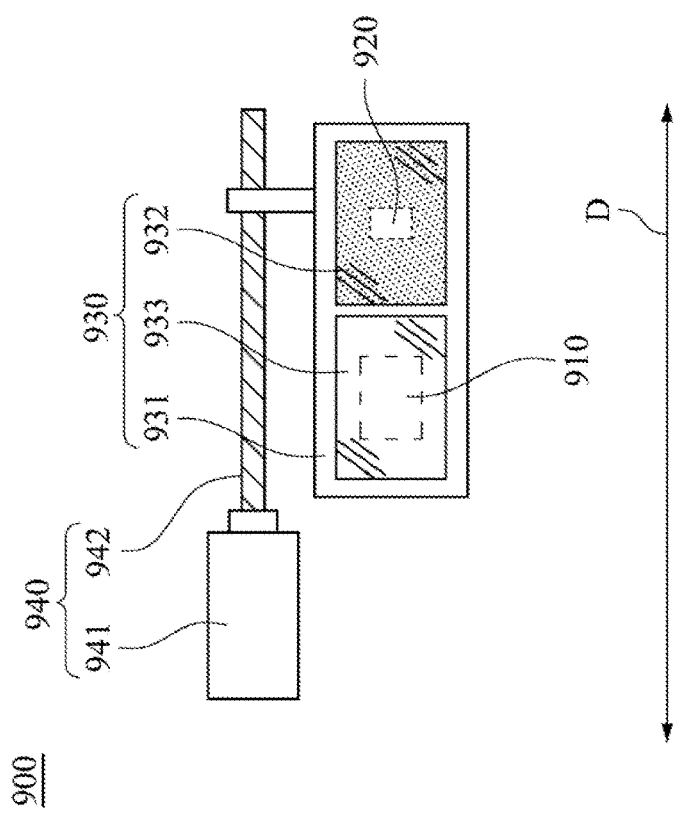

FIG. 9A and FIG. 9B are front views of an image-capturing device 900 when an infrared filter member 932 respectively moves to cover an image sensor 910 and an ambient light sensor 920 according to a variation of a ninth embodiment of the disclosure. Referring to FIG. 9A, the switch module 940 comprises a motor body 941 and a ball screw shaft 452 rotatably controlled by the motor body 941. The filter assembly 930 movably screws on the ball screw shaft 452. Thus, when the motor body 941 triggers the ball screw shaft 452 to rotate, the filter assembly 930 can be reciprocatingly moved on the ball screw shaft 452 according to the rotation of the ball screw shaft 452 for optically moving the infrared filter member 932 to cover the image sensor 910 (FIG. 9B) or the ambient light sensor 920 (FIG. 9A). Substantially, in this embodiment, the ball screw shaft 452 is in a linear shape, and a longitudinal axis of the ball screw shaft 452 is parallel with a sliding direction D of the filter assembly 930. However, the disclosure is not limited thereto, in other embodiment, the type of switch module 940 can be a motor, a solenoid valve, an electromagnet or a conventional one.

FIG. 9C and FIG. 9D are front views of an image-capturing device 901 when an infrared filter member 932 respectively moves to cover an image sensor 910 and an ambient light sensor 920 according to another variation of a ninth embodiment of the disclosure. Referring to FIG. 9C, in this variation of the ninth embodiment, the switch module 940 is an electromagnet unit so as to move the filter assembly 930 to locate between the first optical path of the reflection light and the second optical path of the ambient light in turn by exerting magnetic forces. The second housing 902 includes two opposite long inner walls 902L and two opposite short inner walls 902S, and an elongate accommodation space SP2 is mutually defined by the opposite long inner walls 902L and the opposite short inner walls 902S. The filter assembly 930 is slidably received in the elongate accommodation space SP2 of the second housing 902 in which two opposite longitudinal sides 931S of the main body 931 of the filter assembly 930 are flat contacted with the two opposite longitudinal inner walls 902L of the second housing 902. The filter assembly 930 is allowed to reciprocatingly slide in the elongate accommodation space SP2, and a longitudinal axis of the elongate accommodation space SP2 is parallel with a sliding direction D of the filter assembly 930. The switch module 940 includes at least two magnetic bodies 943, 945 and at least two electromagnetic (ferromagnetic) bodies 944, 946 electrically connected to the controller 160 (FIG. 1C). The magnetic bodies 943, 945 are respectively coupled to two opposite vertical sides 931S of the main body 931 of the filter assembly 930. The electromagnetic bodies 944 are respectively coupled to the opposite short inner walls 902S of the second housing 902.

Thus, refer to FIG. 9D to FIG. 9C, when the controller 160 (FIG. 1C) triggers the electromagnetic body 944, the magnetic of the electromagnetic body 944 is switched to be different with the magnetic of the magnetic body 943, thus, the electromagnetic body 944 magnetically attracts the magnetic body 943 to draw the filter assembly 930 to approach the magnetic body 944, so that the infrared filter member 932 is arranged in front of the ambient light sensor 920, and the transparent sheet 933 in front of the image sensor 910. Meanwhile, the controller 160 (FIG. 1C) also changes the magnetic of the electromagnetic body 946 to be the same as the magnetic of the magnetic body 945. Thus, the electromagnetic body 946 magnetically repels the magnetic body 945 to push the filter assembly 930 away from the electromagnetic body 946.

Otherwise, refer to FIG. 9C to FIG. 9D, when the controller 160 (FIG. 1C) triggers the electromagnetic body 946, the magnetic of the electromagnetic body 946 is switched to be different with the magnetic of the magnetic body 945, thus, the electromagnetic body 946 magnetically attracts the magnetic body 945 to draw the filter assembly 930 to approach the magnetic body 946, so that the infrared filter member 932 is arranged to cover the image sensor 910. Meanwhile, the controller 160 (FIG. 1C) also changes the magnetic of the electromagnetic body 944 to be the same as the magnetic of the magnetic body 943. Thus, the electromagnetic body 944 magnetically repels the magnetic body 943 to push the filter assembly 930 away from the electromagnetic body 944.

Tenth Embodiment

Figure 10A:
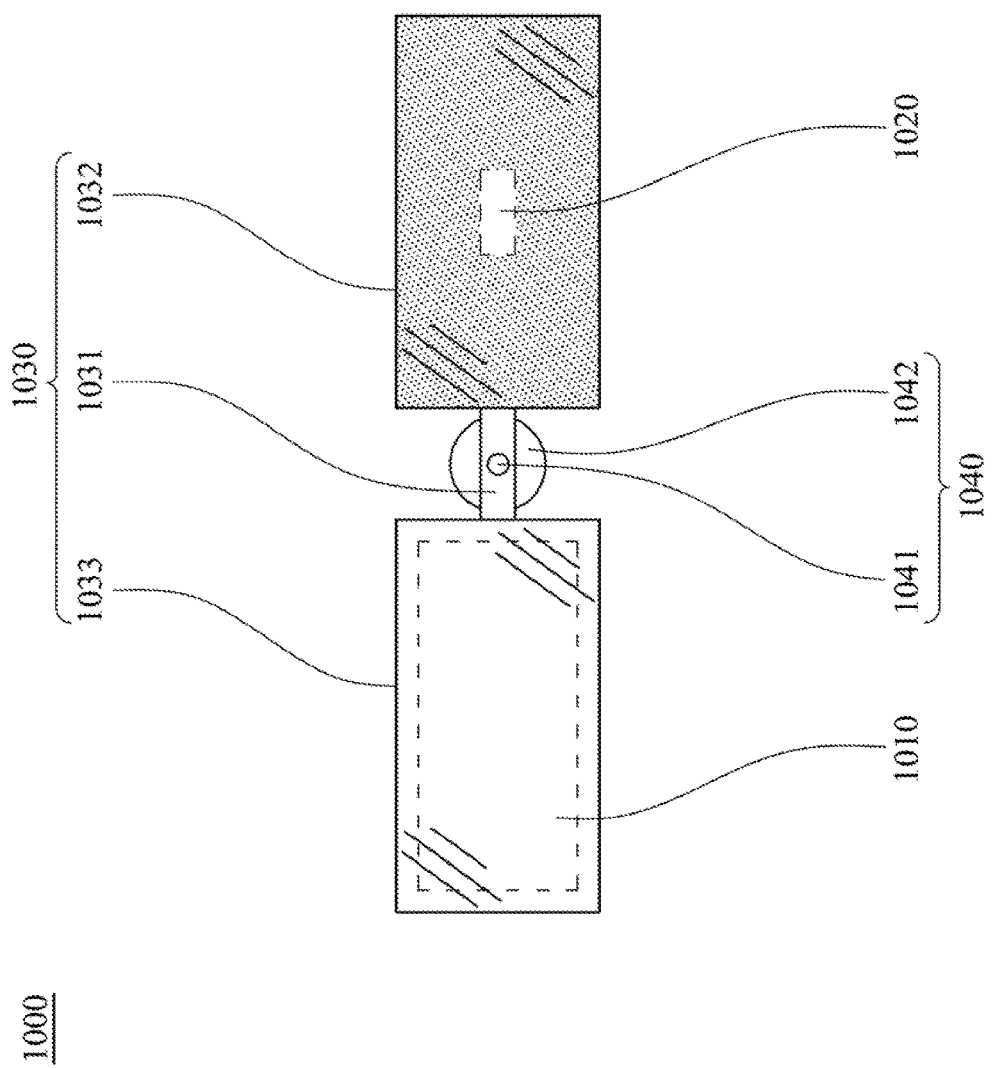
FIG. 10A to FIG. 10C are front views of an image-capturing device when an infrared filter member respectively moves to cover an image sensor and an ambient light sensor according to a tenth embodiment of the disclosure.
Figure 10B:
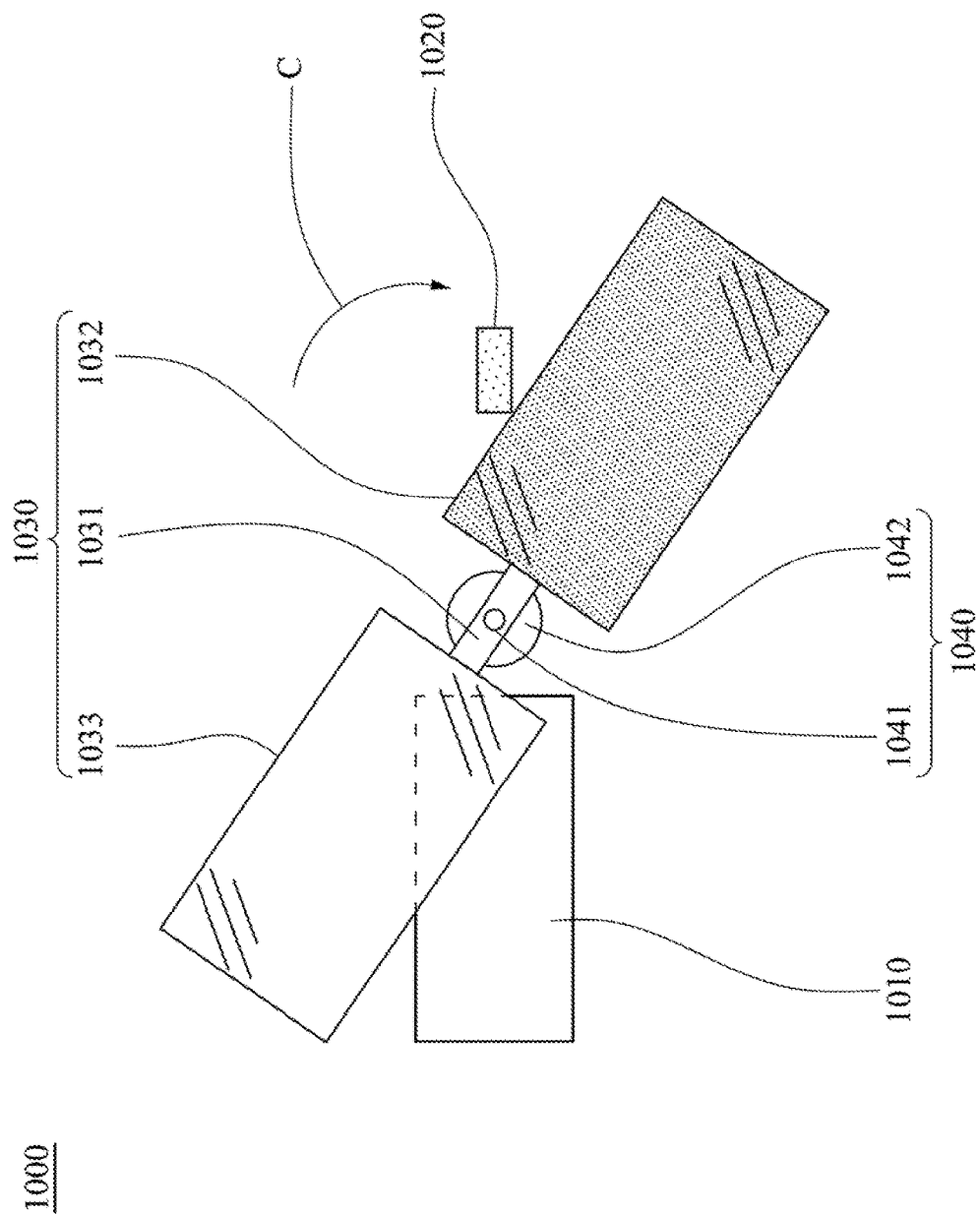
Figure 10C:
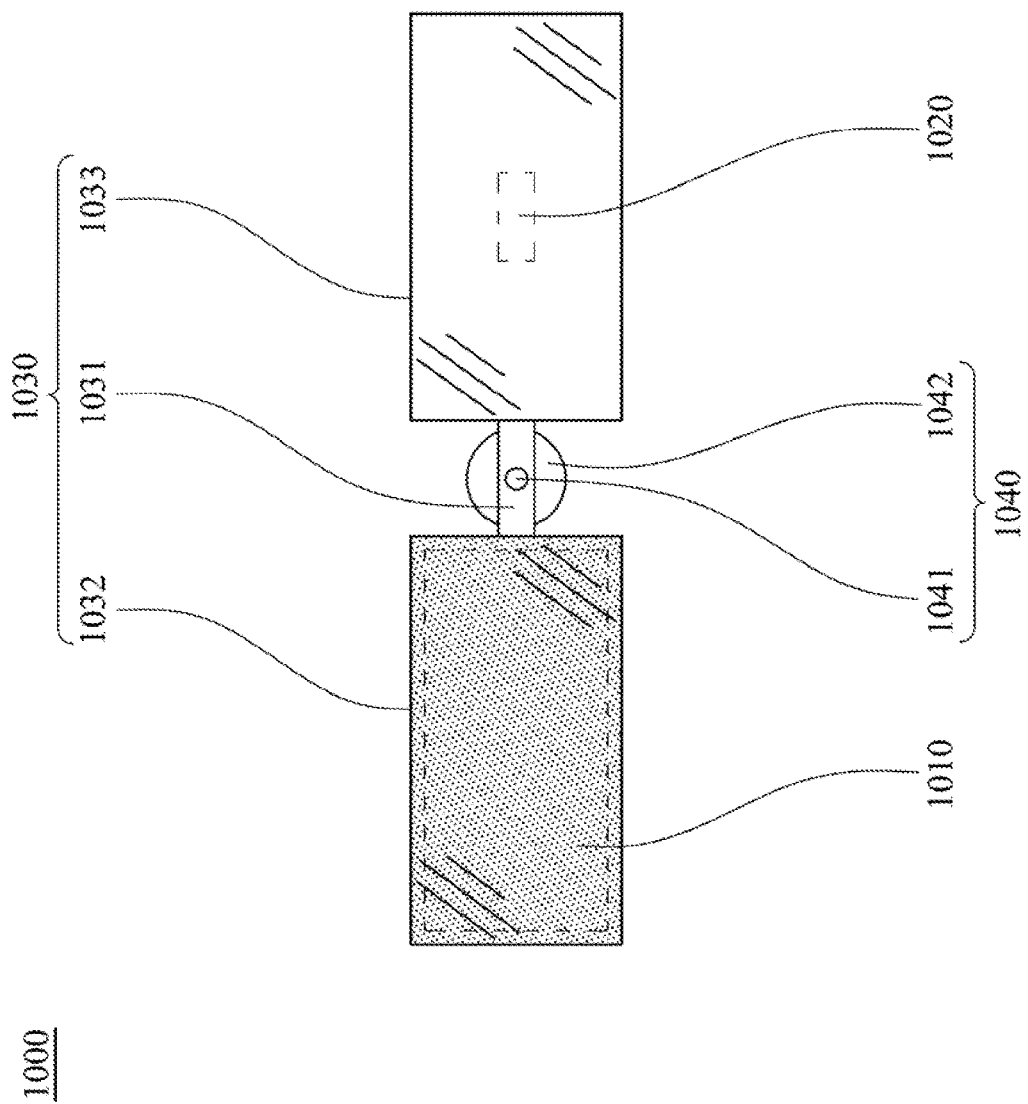

FIG. 10A to FIG. 10C are front views of an image-capturing device 1000 when an infrared filter member 1032 respectively moves to cover an image sensor 1010 and an ambient light sensor 1020 according to a tenth embodiment of the disclosure. Refer to FIG. 10A, rather than FIG. 9A, a switch module 1040, such as a motor, includes a rotary shaft 1041 and a driving element 1042. The rotary shaft 1041 is coaxially connected to the main body 1031 of a filter assembly 1030 and the driving element 1042. The driving element 1042 drives the rotary shaft 1041 to rotate, so as to allow the filter assembly 1030 to rotate about a rotation axis of the rotary shaft 1041.

Thus, referring to FIG. 10A, when the driving element 1042 drives the rotary shaft 1041 to rotate, the filter assembly 1030 can be rotated around the rotation axis of the rotary shaft 1041. When the infrared filter member 1032 is positioned to cover the ambient light sensor 1020 for filtering the infrared rays of the ambient light, a transparent sheet 1033 is positioned to cover an image sensor 1010.

Referring to FIG. 10B and FIG. 10C, when the driving element 1042 drives the rotary shaft 1041 to further rotate the filter assembly 1030 in a clockwise direction C for 180 degree, the infrared filter member 1032 is positioned to cover the ambient light sensor 1020 (i.e., on the second optical path P2 of the ambient light A).

It is noted because the infrared filter member 1032 and the transparent sheet 1033 in this embodiment are arranged symmetrically on two opposite sides of the switch module 1040, and the switch module 1040 is between the ambient light sensor 1020 and the image sensor 1010. Thus, when the infrared filter member 1032 covers one of the ambient light sensor 1020 and the image sensor 1010, the transparent sheet 1033 necessarily positions to cover the other of the ambient light sensor 1020 and the image sensor 1010.

However, the disclosure is not limited thereto, in other embodiment, the type of switch module 1040 also can be a solenoid valve or a conventional one.

Eleventh Embodiment

FIG. 11A to FIG. 11C are front views of an image-capturing device 1100 when an infrared filter member 1132 respectively moves to cover an image sensor 1110 and an ambient light sensor 1120 according to an eleventh embodiment of the disclosure. Compared to the tenth embodiment, refer to FIG. 11A, the image-capturing device 1100 of the eleventh embodiment is substantially the same as the image-capturing device 1100 of the tenth embodiment except that the main body 1131 is shaped as a "L" type, and includes a first section A1 and a second section A2 which are substantially vertical with each other. An infrared filter member 1132 and a transparent sheet 1133 are respectively arranged on the first section 1132 and the second section 1133 thereof.

Referring to FIG. 11A, when the infrared filter member 1132 positions to cover the image sensor 1110 (i.e., on the first optical path P1 of the reflection light R) for filtering the infrared rays of the reflection light, the transparent sheet 1133 positions to cover the ambient light sensor 1120.

Referring to FIG. 11B, when the driving element 1142 drives the rotary shaft 1141 to rotate in a clockwise direction C for 90 degree, the filter assembly 1130 is rotated around the rotation axis of the rotary shaft 1141, such that the infrared filter member 1132 is positioned to cover the ambient light sensor 1120 for filtering the infrared rays of the ambient light.

To be noted, the aforementioned image-capturing device is not limited to a certain type, and for example, the aforementioned image-capturing device can be a surveillance camera or one of other similar portable devices.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An image-capturing device having infrared filtering switchover functions, comprising:
    a first housing;
    at least one infrared light emitting diode disposed on the first housing and configured to emit infrared light outwardly;
    an image sensor disposed in the first housing and configured to receive a first light reflected from an object;
    an ambient light sensor disposed in the first housing and configured to receive the second light from the ambience;
    a filter assembly disposed in the first housing and comprising an infrared filter member being configured to filter infrared rays from the first light at a first location and a second light at a second location; and
    a switch module disposed in the first housing and coupled to the filter assembly, and configured to alternatively move the infrared filter member to the first location covering the image sensor and the second location covering the ambient light sensor, wherein the infrared light is part of the first light and the second light;
    wherein the switch module moves the infrared filter member to the first location to cover the image sensor for filtering the infrared rays from the first light when a light intensity of the second light is higher than a predetermined threshold, and the at least one infrared light emitting diode emits infrared lights and the switch module moves the infrared filter member to the second location to cover the ambient light sensor for filtering the infrared rays from the second light when the light intensity of the second light is below the predetermined threshold.

2. The image-capturing device having infrared filtering switchover functions of claim 1, wherein the first location is on a first optical path of the first light traveling to the image sensor, and the second location is on a second optical path of the second light traveling to the ambient light sensor.

3. The image-capturing device having infrared filtering switchover functions of claim 1, further comprising:
    a lens element disposed on a first optical path of the first light traveling to the image sensor,
    wherein the filter assembly is disposed between the lens element and the image sensor.

4. The image-capturing device having infrared filtering switchover functions of claim 1, further comprising:
    a lens element disposed on a first optical path of the first light traveling to the image sensor,
    wherein the lens element is disposed between the filter assembly and the image sensor.

5. The image-capturing device having infrared filtering switchover functions of claim 1, further comprising:
    a second housing having an accommodation space therein for receiving the ambient light sensor, the filter assembly and the switch module,
    wherein an aperture is formed on the second housing, and the second light is received by the ambient light sensor via the aperture.

6. The image-capturing device having infrared filtering switchover functions of claim 1, further comprising:
    a second housing having an accommodation space therein for receiving the filter assembly and the switch module,
    wherein the ambient light sensor is arranged out of the second housing, and two apertures are formed on opposite sides of the second housing, thus the second light is received by the ambient light sensor via the two apertures.

7. The image-capturing device having infrared filtering switchover functions of claim 1, further comprising:
    an optical reflective element for reflecting the first light towards the image light sensor, and reflecting the second light towards the ambient light sensor,
    wherein the filter assembly is optically arranged between the optical reflective element and the ambient light sensor.

8. The image-capturing device having infrared filtering switchover functions of claim 1, further comprising:
    an optical reflective element for reflecting the first light towards the image sensor, and reflecting the second light towards the ambient light sensor,
    wherein the optical reflective element is optically arranged between the filter assembly and the ambient light sensor, and the optical reflective element is optically arranged between the filter assembly and the image sensor.

9. The image-capturing device having infrared filtering switchover functions of claim 1, wherein the switch module further comprising:

a rotary shaft connected to the filter assembly, so as to allow the filter assembly to rotate about a rotation axis of the rotary shaft; and a driving element for driving the rotary shaft to rotate.

10. The image-capturing device having infrared filtering switchover functions of claim 1, further comprising:

a light guide element disposed between the ambient light sensor and the filter assembly, for guiding the second light towards the ambient light sensor.

11. The image-capturing device having infrared filtering switchover functions of claim 1, further comprising:

a second housing having an accommodation space therein for receiving the filter assembly and the switch module; and the switch module comprises:

at least two magnetic bodies coupled to opposite sides of the filter assembly; and at least two electromagnetic bodies disposed on two opposite inner walls of the second housing, and configured to move the filter assembly between the first location and the second location by exerting magnetic forces to the at least two magnetic bodies in opposite directions.

12. An image-capturing device having infrared filtering switchover functions, comprising:

a first housing;

at least one infrared light emitting diode disposed on the first housing and configured to emit infrared light outwardly;

an image sensor disposed in the first housing and configured to receive a first light reflected from an object, and convert the first light into a video signal;

an ambient light sensor disposed in the first housing and configured to receive a second light from the ambience, and convert the second light into a detecting signal;

a filter assembly disposed in the first housing and comprising an infrared filter member being configured to filter infrared rays from the first light at a first location and the second light at a second location; and a switch module disposed in the first housing and coupled to the filter assembly, and configured to alternatively move the infrared filter member to the first location covering the image sensor and the second location covering the ambient light sensor; and a controller disposed in the first housing, and electrically connected to the switch module, the infrared light emitting diode and the ambient light sensor, wherein the controller controls the switch module to move the infrared filter member to the first location to cover the image sensor for filtering the infrared rays from the first light when the controller determines a light intensity of the detecting signal is higher than a predetermined threshold, and the controller controls the at least one infrared light emitting diode to emit infrared lights and controls the switch module to move the infrared filter member to the second location to cover the ambient light sensor for filtering the infrared rays from the second light when the light intensity of the detecting signal is below the predetermined threshold.

13. The image-capturing device having infrared filtering switchover functions of claim 12, wherein the first location is on a first optical path of the first light traveling to the image sensor, and the second location is on a second optical path of the second light traveling to the ambient light sensor.

14. The image-capturing device having infrared filtering switchover functions of claim 12, further comprising:

a lens element disposed on a first optical path of the first light traveling to the image sensor, wherein the filter assembly is disposed between the lens element and the image sensor.

15. The image-capturing device having infrared filtering switchover functions of claim 12, further comprising:

a lens element disposed on a first optical path of the first light traveling to the image sensor, wherein the lens element is disposed between the filter assembly and the image sensor.

16. The image-capturing device having infrared filtering switchover functions of claim 12, further comprising:

a second housing having an accommodation space therein for receiving the ambient light sensor, the filter assembly and the switch module, wherein an aperture is formed on the second housing, and the second light is received by the ambient light sensor via the aperture.

17. The image-capturing device having infrared filtering switchover functions of claim 12, further comprising:

a second housing having an accommodation space therein for receiving the filter assembly and the switch module, wherein the ambient light sensor is arranged out of the second housing, and two apertures are formed on opposite sides of the second housing, thus the second light is received by the ambient light sensor via the two apertures.

18. The image-capturing device having infrared filtering switchover functions of claim 12, further comprising:

an optical reflective element for reflecting the first light towards the image sensor, and reflecting the second light towards the ambient light sensor, wherein the filter assembly is optically arranged between the optical reflective element and the ambient light sensor.

19. The image-capturing device having infrared filtering switchover functions of claim 12, further comprising:

an optical reflective element for reflecting the first light towards the image sensor, and reflecting the second light towards the ambient light sensor, wherein the optical reflective element is optically arranged between the filter assembly and the ambient light sensor, and the optical reflective element is optically arranged between the filter assembly and the image sensor.

20. The image-capturing device having infrared filtering switchover functions of claim 12, further comprising:

a second housing having an accommodation space therein for receiving the filter assembly and the switch module; and the switch module comprises:

at least two magnetic bodies coupled to opposite sides of the filter assembly; and at least two electromagnetic bodies disposed on two opposite inner walls of the second housing, electrically connected to the controller, and configured to move the filter assembly between the first location and the second location by exerting magnetic forces to the at least two magnetic bodies in opposite directions.

* * * * *